(12) United States Patent
Johnson

(10) Patent No.: US 12,356,974 B2
(45) Date of Patent: Jul. 15, 2025

(54) STORAGE DEVICES AND METHODS OF USE THEREOF

(71) Applicant: Sven Johnson, Denver, CO (US)

(72) Inventor: Sven Johnson, Denver, CO (US)

(73) Assignee: Sven Johnson, Denver, CO (US)

( * ) Notice: Subject to any disclaimer, the term of this patent is extended or adjusted under 35 U.S.C. 154(b) by 131 days.

(21) Appl. No.: 18/046,242

(22) Filed: Oct. 13, 2022

(65) Prior Publication Data

US 2023/0232804 A1    Jul. 27, 2023

Related U.S. Application Data

(60) Provisional application No. 63/324,485, filed on Mar. 28, 2022, provisional application No. 63/256,563, filed on Oct. 16, 2021.

(51) Int. Cl.

| | |
|---|---|
| *A01K 97/06* | (2006.01) |
| *B65D 25/20* | (2006.01) |
| *B65D 43/16* | (2006.01) |
| *B65D 43/22* | (2006.01) |
| *B65D 71/70* | (2006.01) |

(52) U.S. Cl.
CPC ............. *A01K 97/06* (2013.01); *B65D 25/20* (2013.01); *B65D 43/165* (2013.01); *B65D 43/22* (2013.01); *B65D 71/70* (2013.01); *B65D 2251/1058* (2013.01); *B65D 2543/00194* (2013.01); *B65D 2571/00808* (2013.01)

(58) Field of Classification Search
CPC ..... A01K 97/06; A45F 2005/008; A45F 5/00; A45F 2003/006; B65D 43/165; B65D 43/22; B65D 25/10
See application file for complete search history.

(56) References Cited

U.S. PATENT DOCUMENTS

| | | |
|---|---|---|
| 2,558,124 A | 6/1951 | Burden |
| D263,519 S | 3/1982 | Ader |
| 5,454,185 A | 10/1995 | Love |
| 5,505,354 A | 4/1996 | Hutton et al. |
| 9,468,243 B2 | 10/2016 | Rothschild et al. |
| D834,308 S | 11/2018 | Knudsen et al. |
| 10,561,133 B2 | 2/2020 | Martin |

(Continued)

OTHER PUBLICATIONS

Trxstle. Product Page for BWC Fly Box & Mountable Waterproof Case, Retrieved from the Internet at <https://www.trxstle.com/products/big-water-case?srsltid=AfmBOorTZF1rHgr3TY6zkRJgXW1sh9-4iHrcZvHX2vWARbT3-y7J7JLn>, 31 Pages (Published 2020, Accessed Oct. 2024).

(Continued)

*Primary Examiner* — Corey N Skurdal
(74) *Attorney, Agent, or Firm* — Nixon Peabody LLP

(57) ABSTRACT

In some embodiments, apparatuses and methods are provided herein useful to storage devices. In some embodiments, a mountable storage device comprises a container including a base and a plurality of sidewalls, wherein the plurality of sidewalls define an inner cavity, wherein at least one of the plurality of sidewalls includes a retention member, and wherein the base includes a mounting point, a strap removably secured to the container via the mounting point, and an insert including a plurality of slits configured to receive and secure fishing tackle, wherein the insert is releasably retained within the inner cavity via the retention member.

7 Claims, 17 Drawing Sheets

(56) References Cited

U.S. PATENT DOCUMENTS

| | | |
|---|---|---|
| 2004/0251285 A1* | 12/2004 | O'Neill .................... A45F 5/00 |
| | | 224/221 |
| 2005/0279012 A1 | 12/2005 | Wieringa et al. |
| 2007/0017147 A1 | 1/2007 | Manzo |
| 2008/0245831 A1 | 10/2008 | Simon |
| 2015/0047249 A1 | 2/2015 | Smith |
| 2018/0042209 A1* | 2/2018 | Aston .................... A01K 83/00 |

OTHER PUBLICATIONS

Riffle Monster Trading Company. Product Page for Fly Fishing Gear, Handmade Silicone Wrist Band Holds Extra Fly Fishing Flies, Retrieved from the Internet at <https://www.ebay.com/itm/164910509289> 4 Pages (Published 2022, Accessed Oct. 2024).

Lid Rig. Product Page for Mag Band by Lid Rig, Retrieved from the Internet at <https://lidrig.com/products/mag-band> 5 Pages (Published 2020, Accessed Oct. 2024).

Flybandz. Homepage, Retrieved from the Internet at <https://flybandz.com/> 5 Pages (Published 2019, Accessed Oct. 2024).

Bugwatch. Collections Page, Retrieved from the Internet at <https://bugwatchflyfishing.com/collections/all> 6 Pages (Published 2022, Accessed Oct. 2024).

* cited by examiner

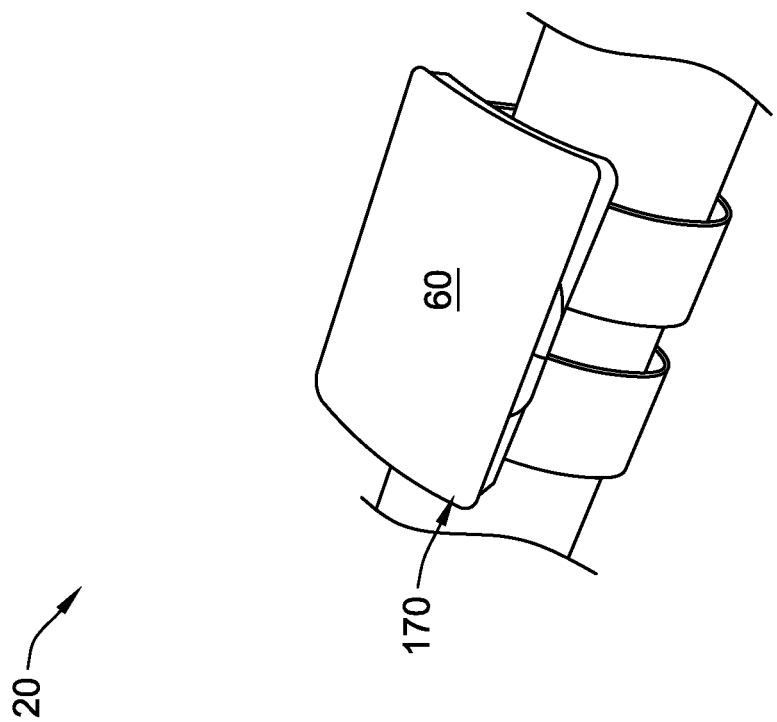
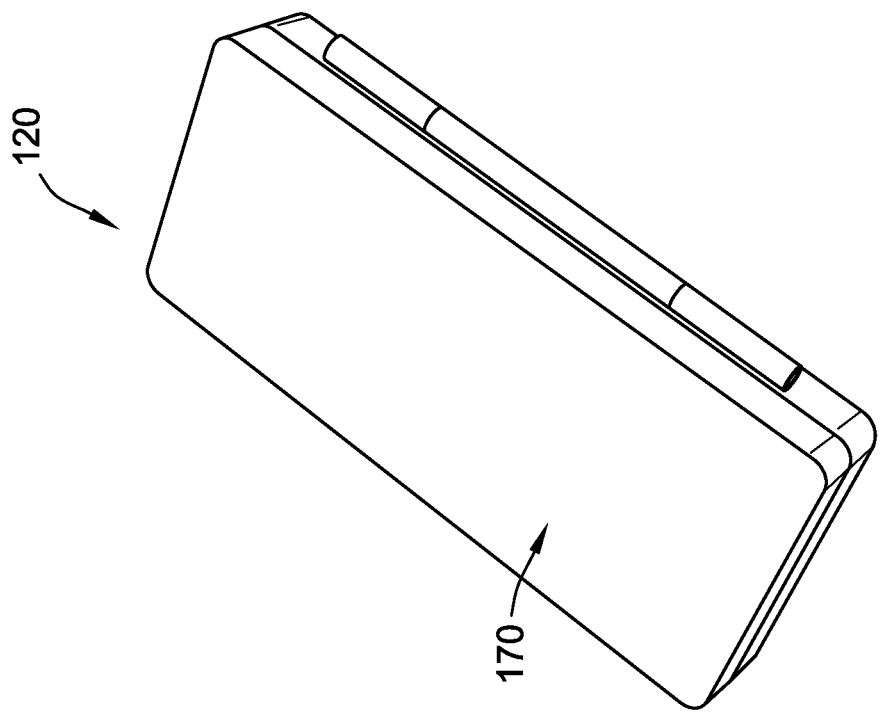
FIG. 17

STORAGE DEVICES AND METHODS OF USE THEREOF

CROSS-REFERENCE TO RELATED APPLICATIONS

This application claims the benefit of and priority to U.S. Provisional Application No. 63/324,485, filed Mar. 28, 2022, and U.S. Provisional Application No. 63/256,563 filed Oct. 16, 2021, both of which are incorporated herein by reference in their entireties.

TECHNICAL FIELD

This invention relates generally to storage devices and, more specifically, storage devices for organizing items for subsequent use.

BACKGROUND

In fly fishing, the sportsman will purchase flies typically at a local shop (or make themselves). When they do this, it is common to purchase them in groups depending on what they plan to fish for or cater the variety of flies and lures to the type of water they are fishing (lake, stream, river, tailwaters, etc.) in which they put them in a small container, then at check out, they separate them out to count how many flies they are purchasing. After purchasing, they will take this and then, again, individually separate the flies and one by one, insert them into their fly boxes in the way they want them to be organized. This is a time consuming process that requires placement, removal, and organization of the flies multiple times.

During the time a fisherman is out on the water actively fishing, they will frequently change bait, flies, lures in order to figure out what is most appealing to the fish at that time. Due to this, it is important for the fisherman to carry multiple flies and lures to use. In most cases, there are specific techniques and approaches in choosing what bait, flies, etc. to use for different purposes, for example the bait choice on a lake may be different than the bait choice on a stream or river to imitate a fish's natural food source in that environment. The same philosophy can apply when it comes to different species, different seasons during the year and other environmental factors. In order to cater their approach depending on factors like this, it is common for a sportsman to group their flies in different fly boxes (storage boxes) depending on what is typically going to work best in their approach to harvest. Some fishermen may have many different boxes depending on these factors, and when they go out to actually fish, they will choose to bring one or multiple of those boxes. The fisherman will then choose a fly from one of the boxes and put it on their fishing line to fish. They will do this by taking the box out of their pocket, back pack, or vest and resting it on a surface, opening it up, choosing the fly, closing the box and then put it back in their pocket, bag, vest, etc. so they can tie the fly onto the fishing line. This process will happen many times during an outing and can be very frequent. Placing the storage box on a surface and using multiple hands to accomplish the task can pose risk where the fisherman may lose control, drop the box in the water, lose flies and can also just be a tedious task with many steps. This also requires that the fisherman take out one fly at a time from a secured place in their fly box rather than a group of flies when they are changing their approach with bait. Accordingly, a need exists for better systems, methods, and apparatuses for organizing, carrying, and selecting flies.

BRIEF DESCRIPTION OF THE DRAWINGS

Disclosed herein are embodiments of systems, apparatuses, and methods pertaining to storage devices. This description includes drawings, wherein:

FIG. 17 is a perspective view of a master fly pad insert storage device and the mountable fishing tackle storage device mounted in an closed configuration with fly pad moved and fully inserted to the mountable fishing tackle storage device.

Figure 1:
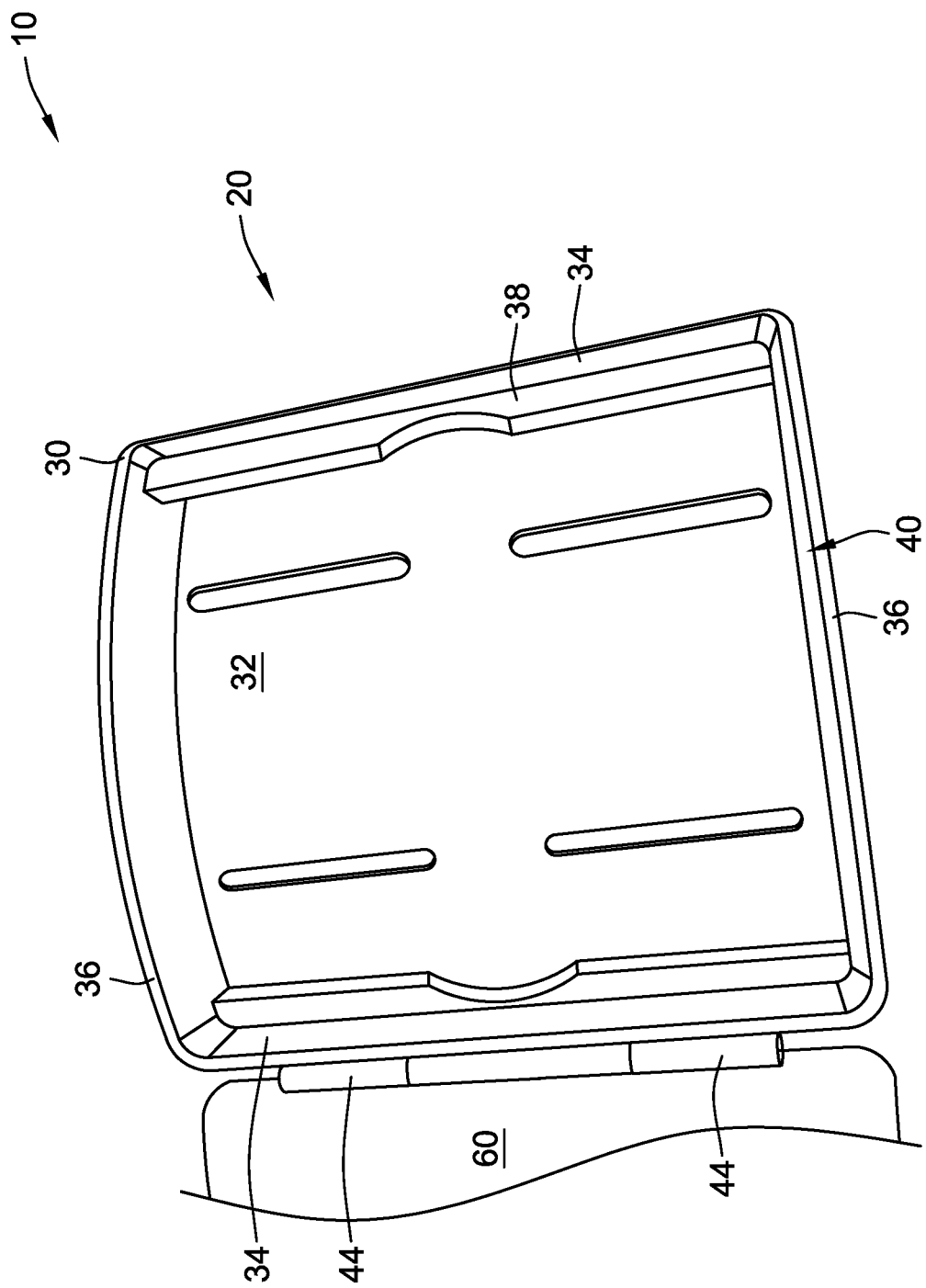
FIG. 1 is 1 is a perspective view of one embodiment of a mountable fishing tackle storage device in an open configuration, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

Generally speaking, pursuant to various embodiments, systems, apparatuses, and methods are provided herein useful to storage devices. In some embodiments, a mountable storage device comprises a container including a base and a plurality of sidewalls, wherein the plurality of sidewalls define an inner cavity, wherein at least one of the plurality of sidewalls includes a retention member, and wherein the base includes a mounting point, a strap removably secured to the container via the mounting point, and an insert including a plurality of slits configured to receive and secure fishing tackle, wherein the insert is releasably retained within the inner cavity via the retention member.

As previously discussed, current approaches for storing and organizing flies require a fisherman to repeatedly remove, organize, and replace flies. Additionally, current approaches are cumbersome to use during fishing. Described herein are systems, methods, and apparatus that seek to minimize, if not eliminate, the drawbacks of current approaches.

Because the fisherman spends so much time and performs so many steps to acquire bait, organize bait and interchange bait for fishing, this systems, methods, and apparatus described herein help to make the process more efficient, organized and convenient for the sportsman. In one embodiment, a storage system comprises a fly pad insert, master fly pad storage device, a mountable curved storage device, and a mountable flat storage device.

Today, fly boxes are boxes that have a pad that is glued/adhered to the surface of the fly box base or lid. It may or may not have slits in the pad to designate a slot for the fly hook. Generally, the fly pad insert described herein is a removable and interchangeable insert that can be exchanged between boxes. The insert is a universal shape and dimension as the storage box cavity for placing and removal. The insert has slits in it that hold the hook of a fishing lure, fly or bait and compresses on the sides of the object to hold it in place. The slits are organized in a way that they are easily seen, counted and separated from one another. In addition, in some embodiments, the insert has a half circle cut out specifically to assist the user with insertion and removal from a storage device with one finger. Traditionally, any sort of insert in fly boxes fill the entire cavity.

One of the starting points for a fisherman is the purchase of flies and bait described above. Also described above is how common it is that the flies need to be organized multiple times before they get placed into their storage boxes. Using the fly pad insert described herein, a fisherman can take an empty pad to their local fly shop and fill it up with the flies that they intend on using on their next outing. By doing this, they will be organizing the way they store groups of flies on the front end of the process. In addition, upon check out, the cashier can easily see the number (prices are often determined by quantity) of flies the customer has picked out to purchase instead of re-counting out on the counter. The fisherman will then be able to take this pad and insert it into any one of their storage devices for a secure hold. In one embodiment, this can be done with the master fly pad storage device (i.e., a primary storage device) that they will then choose from later. Because the fly pad insert has a common shape, in some embodiments, it can fit in the system of boxes, it reduces the need for many different boxes for the fisherman. They can simply carry a point of use box (e.g., the mountable curved storage device) and a main storage box (e.g., the master fly pad storage device) for the fly pad insert, which can make the experience more simple and easy by reducing the number of boxes.

Today, organized storage for flies in boxes is limited to the number of slits in the pad that is glued into the base or lid of the storage box. In the master fly pad storage device, the user will have the ability to interchange and exchange multiple fly pad inserts which will increase or decrease the amount of organized fly storage available for flies. This storage device serves as the main storage device for multiple groups of flies in one place in an organized and exchangeable manner. The storage of the fly pad insert is maintained by retaining the fly pad inserts in a manner whether the storage device is in an open or closed position (i.e. they could place the Fly Pad inserts in the storage device, in an open position, turn it upside down and the Fly Pad inserts along with the flies inserted into the fly pad inserts will remain in place and not fall out). This is done through a mechanism that allows for easy removal and insertion, likely done with one hand. The retaining of the fly pad insert can use tabs to apply pressure on the fly pad insert to keep the pad in place, rather than an adhesive that is not exchangeable and sustainably retained. This is where a user would fill fly pad inserts with different varieties of flies according to their typical strategies (lakes, rivers, tailwaters, etc.). The user will then be able to remove a group of flies that is catered to their strategy and then place it in the point of use box (e.g., the mounted curved storage described below) where the flies are more readily available for the common task of changing bait. This will reduce the quantity of different boxes a fisherman would use while maintaining the same organization flexibility.

Today fishermen have options of storing flies for temporary use by placing them back in their fly boxes, placing them on objects like the fabric of a bag, or an external piece of foam on a bag. This is important for the fisherman as they are exchanging flies throughout the fishing process and need a place to temporarily place a fly while their hands are full until they are ready to more permanently store or use it. It can also be common to temporarily store multiple flies in these easy to grab points of use (outside of their normal storage boxes) because they have a plan in which they want to try different flies for their fishing approach. This can be an issue because these point of use storage methods are not protected from damage or loss of the flies and also requires moving flies individually from their main storage. It is common that a fisherman will be walking through brush, willows and trees where they come in contact with tight spaces and have to maneuver through it. When this happens, flies that are stored on the exterior of bags, fabrics, and such come in contact with branches and brush and knock them off causing the fisherman to lose flies. With the mountable fishing storage device, it allows fishermen to utilize a point of use location on the exterior of bags, clothing, etc. with a protected hard surface to avoid losing flies when moving around.

In one embodiment, the Mountable Curved Storage Device serves as a point of use storage for flies in a temporary or semi-permanent fashion. The user would place the mountable storage device onto an external surface (e.g., a curved or flat surface) such as their arm, boat ore by using the attached straps, tree branch, leg, fishing rod, etc. The straps can be made of any suitable material (e.g., a woven material, a rubber material, a synthetic material, a natural material, etc.). In some embodiments, the strap are elastic (e.g., they are made of a stretchable material). By placing it on an object that is readily available, they will not have to constantly reach into their bag, pocket or vest to get access to their flies. In some embodiments, this storage device is made with the same mechanism and dimensions to store the fly pad insert the same way the Master Storage Device would (tab for pressure, magnet, hook and loop, etc.). This way the user can take a fly pad insert from their Master Storage Device and be able to transfer a group of flies (as opposed to individual flies) to a point of use location. Once transferred to the point of use location, the user will be able to exchange individual flies from their fishing line and the point of use storage device. The user may exchange the fly pad inserts with other fly pad inserts from the Master Storage Device multiple times in addition to their individual use from the point of use Storage.

Using the Curved surface of the box which is unique from the standard flat surface of boxes, it provides the ability to seamlessly attach the storage device to a body part such as the arm. This provides a newer, more convenient location that doesn't require a bag, vest or other common accessories for fishermen. The same way a quarterback in football has his playbook on his wrist, the fisherman will have the same resource for their "plays" or approaches with bait to fish. Since this storage location can have a lot of movement, the material of the storage device can be hard and have a closable lid that serves as protection to the fly pad insert and the flies from being lost or ripped off when moving through brush. As described above, with the current point of use locations such as the foam on the outside of a backpack, it can be common that flies get hit by a branch and knocked off and lost. This storage device allows the user to contain and protect these objects. Again, the curved surface of the mountable device in combination with the straps extending from it provide a unique ability to attach the storage device to a desired point of use rather than a pocket, bag, or vest.

Similar to the above reference for mounting a curved point of use storage box, there can be a use for point of use storage that is not subject to a curved surface. Instead of this storage box being curved, this storage box remains with a flat bottom surface for mounting to flat surfaces. This is done using a mechanism buckles, latches, hinges, hook and loop, etc. In the case where it is attached by hook and loop on the bottom surface of the storage box. For example, when the box has a hook or loop surface that can be pressed onto an object (like a bag) that has the opposing surface of hook or loop. This storage device also maintains the same mechanism and dimensions to store the fly pad insert the same way the Master Storage Device would (tab for pressure, magnet, hook and loop, etc.). This way the user can take a fly pad insert from their Master Storage Device and be able to transfer a group of flies (not individual flies) to a point of use location. Again, this also serves as a point of use storage for groups of flies that are protected through a hard surface storage and lid for easy point of use access. It provides the ability to continually exchange the groups of flies between the Master Storage Device, the Mountable Curved Storage Device or used individually from the two.

Figure 2:
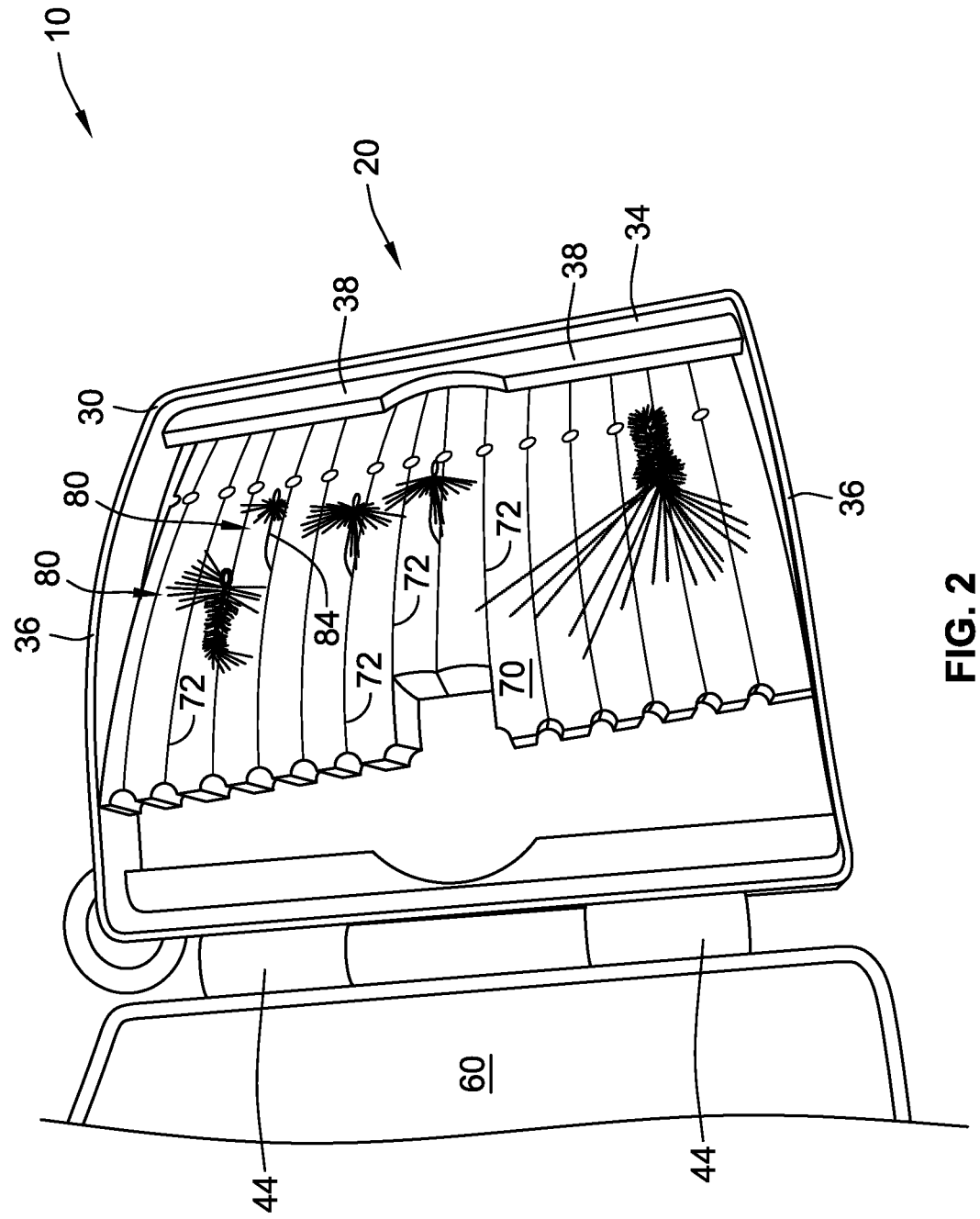
FIG. 2 is a perspective view of the fishing tackle storage device of FIG. 1, with an insert being in a partially-installed position, according to some embodiments.
Figure 3:
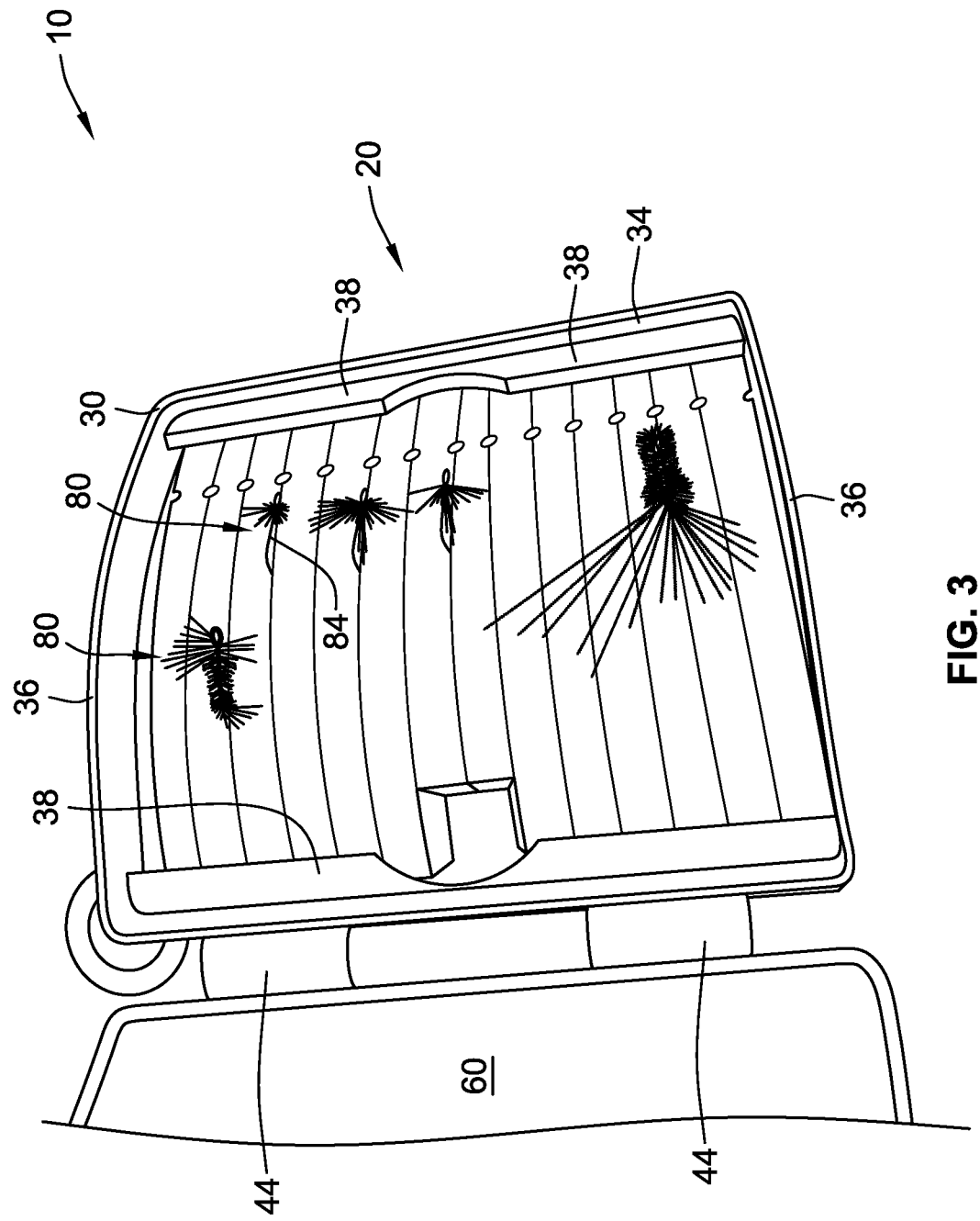
FIG. 3 is a perspective view of the fishing tackle storage device of FIG. 1, with the insert of FIG. 2 being in a fully-installed position, according to some embodiments.

The Fly Pad, Master Storage Device, and Mountable Storage Devices (curved and flat) can be used as a system to provide a sportsman with an integrated, common method for purchasing, organizing, storing, moving and protecting groups of objects (their flies) in a process (fishing), rather than individually through different storage methods. In addition, the mountable storage devices provide a new opportunity for point of use to the fishermen where they can access flies more conveniently, while also staying protected from the elements instead of being exposed where damage and loss can occur. Each one of the components is unique by the commonality of the Fly Pad Insert, retention, modularity and exchangeability between one another and can be used individually or as a system with main storage and point of use protected storage. Curved Mountable Storage Device and Fly Pad One embodiment of a mountable fishing tackle storage device is illustrated in FIGS. 1-3 and is identified by reference numeral 10. The fishing tackle storage device 10 includes a container 20, an insert 70, and a mounting system (not shown) for installing the fishing tackle storage device 10 on any appropriate support (e.g., a fisherman's arm; an oar; a pole; a frame). A container body 30 and a cover 60 collectively define the container 20. Both the container body 30 and cover 60 may be formed from any appropriate material (e.g., plastic; a material(s) that is at least substantially impervious to water), but preferably define what may be characterized as a hardside container 20. Generally, the cover 60 is movable relative to the container body 30 between open and closed positions, preferably while remaining structurally interconnected with the container body 30. A snap-lock may exist between the container body 30 and cover 60 when the cover 60 is in its closed position. Any appropriate restraint may be used to retain the cover 60 in its closed position, but preferably a single hand of a user (and not tooling) is required to displace the cover 60 from the container body 30 to dispose the cover 60 in its open position. Components of the container body 30 include a bottom 32, a pair of sidewalls 34 that are spaced from another and that extend upwardly from the bottom 32, and a pair of end walls 36 that extend upwardly from the bottom 32 and that are spaced from one another along a support (e.g., a user's arm) in an installed/mounted configuration for the fishing tackle storage device 10. In one embodiment, the bottom 32 includes a plurality of slots to accommodate receipt of a pair of straps of the type used by the embodiment of FIGS. 4-8 and that is discussed in more detail below. An internal storage space 40 is collectively defined by the bottom 32, sidewalls 34, and end walls 36. The insert 70 is removably disposable in this internal storage space 40. One or more retention members 38 (e.g., tabs, lips, protrusions, etc.) extend from each of the sidewalls 34 of the container body 30 to retain the insert 70 within this internal storage space 40. The retention members 38 may exclusively provide for the retention of the insert 70 within the container body 30 (e.g., the insert 70 is not bonded to the container body 30). One edge portion of the insert 70 may be disposed under each tab/lip 38 that extends from one of the sidewalls 34, while the opposite edge portion of the insert 70 may be disposed under each tab/lip 38 that extends from the other of the sidewalls 34.

The cover 60 is movably connected with the container body 30 in any appropriate manner for movement between an open position/configuration and a closed position/configuration. In one embodiment, the cover 60 remains structurally interconnect with the container body 30 when in the open position and the closed position. In the illustrated embodiment the cover 60 and container body 30 are movably interconnected by a hinge 44 that allows the cover 60 to move relative to the container body 30 between the noted open and closed positions by movement at least generally about an axis. The axis about which the cover 60 moves relative to the container body 30 will be at least generally parallel/coincide with the long axis of a user's arm when the fishing tackle storage device 10 is installed on such an arm. Any appropriate manner for retaining the cover 60 in its closed position/configuration may be utilized, such as a snap-lock or the like. However, preferably the cover 60 may be "unlocked" from it closed position/configuration by a single hand of a user and without the use of any tooling or the like such that the cover 60 may thereafter be moved to its open position/configuration. The container 20 may be configured to provide at least somewhat of an impediment to the entry of water into the internal storage space 40 when the cover 60 is in its closed position/configuration.

Both the container body 30 and cover 20 have a preformed curvature that is at least generally about the long axis of a user's arm when the fishing tackle storage device 10 is installed on such an arm. That is, the bottom 32 of the container body 30 has a preformed curvature proceeding from one side wall 34 to its opposite side wall 34, and with the cover 60 having a matching/corresponding curvature. The axis about which the cover 60 moves relative to the container body 30 in moving between its open/closed positions/configurations is parallel to the axis about which the bottom 32 of the container body 30 (and the cover 60) is curved. The bottom 32 of the container body 30 may be curved in a single dimension about an axis that is parallel to the axis that the cover 60 moves between its open and closed positions.

The insert 70 includes a plurality of slits 72 that are typically disposed in parallel relation to one another. Fishing tackle 80 (e.g., lures 80, hooks, jigs, flies, etc.) may be removably disposed in each of the slits 72. In the illustrated embodiment each fishing lure 80 is in the form a hook 84 and a fly 82. The fishing tackle storage device 10 allows a fly fisherman to have one collection of fishing lures 80 on one insert 70, and a different collection of fishing lures 80 on a different insert 70. A user may readily change out one insert 70 (with a first collection of fishing lures 80) for another insert 70 (with a second collection of fishing lures). However, only one insert 70 is disposable in the container 20 at a given time.

Typically, a user will only need to use one hand (and no tooling) to install in insert 70 in the container body 30, and to also completely remove this insert 70 from the container body 30. Referring to FIG. 2, the user may dispose one edge portion of the insert 70 under the tab(s)/lip(s) 38 at one of the side walls 34 for the container body 30. The insert 70 may be flexed so as to allow the opposite edge portion of the insert 70 to be directed under the tab(s)/lip(s) 38 at the other of the side walls 34 for the container body 30 (FIG. 3). Accordingly, opposite edge portions of the installed insert 70 are captured under the corresponding tabs/lips 38 of the container body 30. When the insert 70 is installed within the container body 30 and as shown in FIG. 3, the length dimension of each slit 72 is oriented to follow the curvature of the bottom 32 of the container body 30. Stated another way, the length dimension of each slit 72 at least generally coincides with the dimension in which the two side walls 34 of the container body 30 are spaced from one another when in the insert 70 is in its installed configuration. Again, the tabs/lips 38 should suitably retain an insert 70 within the container body 30 without the need for any additional type of attachment between the insert 70 and container body 30.

Another embodiment of a mountable fishing tackle storage device is illustrated in FIGS. 4-8 and is identified by reference numeral 10'. Corresponding components between the embodiment of FIGS. 1-3 and the embodiment of FIGS. 4-8 are identified by the same reference numeral, with those corresponding components that differ in at least some respect being identified by a "single prime" designation in the embodiment of FIGS. 4-8. Unless otherwise noted to the contrary herein, the discussion of the embodiment of FIGS. 1-3 remains equally applicable to the embodiment of FIGS. 4-8.

The fishing tackle storage device 10' utilizes a mounting system in the form of one or more straps 50 (two in the illustrated embodiment), along with a container 20' that is of a different configuration from that of the embodiment of FIGS. 1-3 (e.g., formed from a different material). A container body 30' and a cover 60 collectively define the container 20'. A living hinge may movably interconnect the container body 30' and cover 60 to allow the cover 60 to be moved between open and closed positions/configurations while remaining structurally interconnected with the container body 30'. The axis of this living hinge may be parallel with a reference axis 46 shown in FIGS. 7 and 8. As above, both the container body 30' and cover 60 may be formed from any appropriate material (e.g., plastic; a material(s) that is at least substantially impervious to water), but preferably define what may be characterized as a hardside container 20'.

Figure 7:
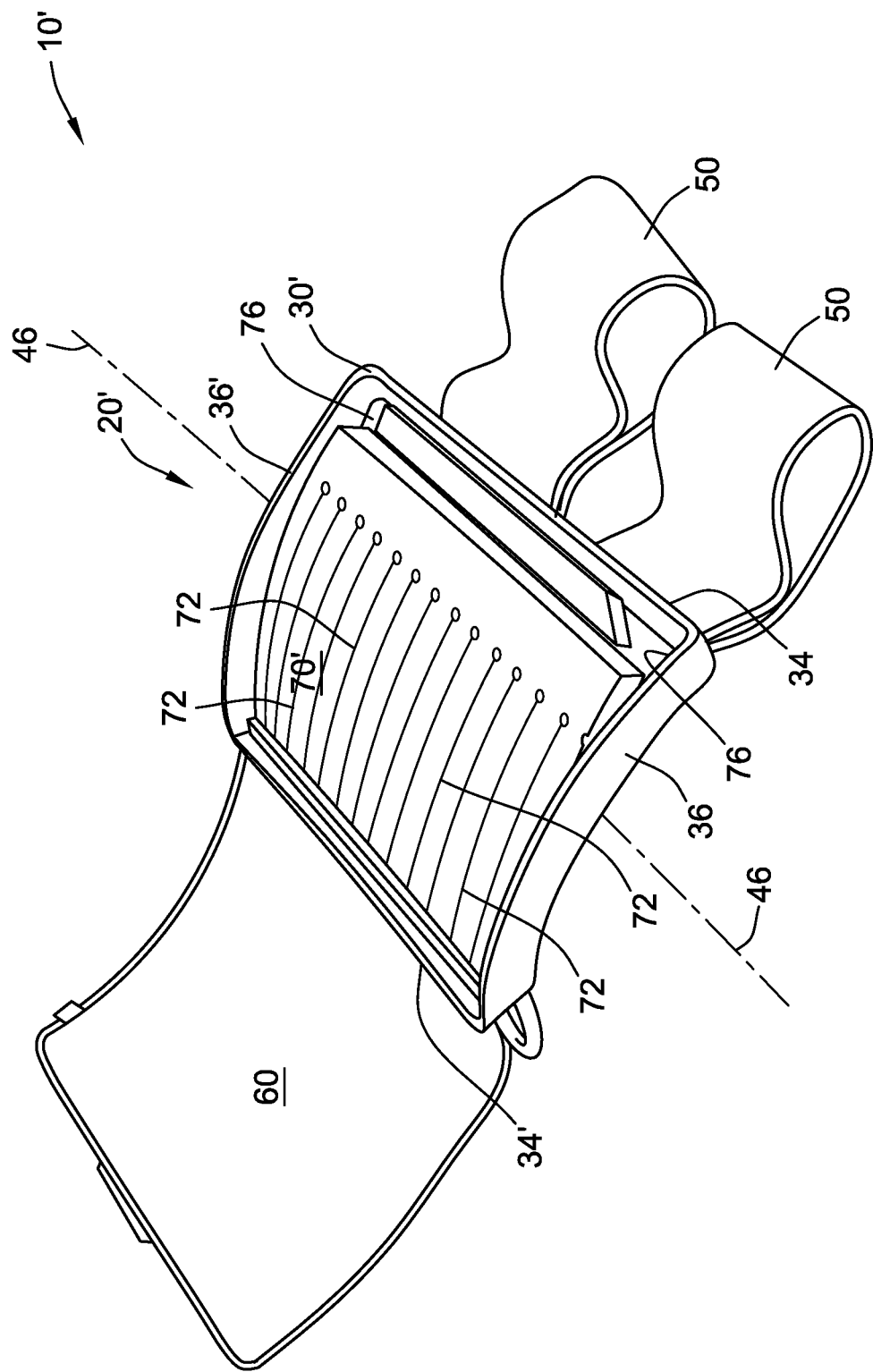
FIG. 7 is a perspective view of the fishing tackle storage device of FIG. 4 in an open configuration, according to some embodiments.
Figure 8:
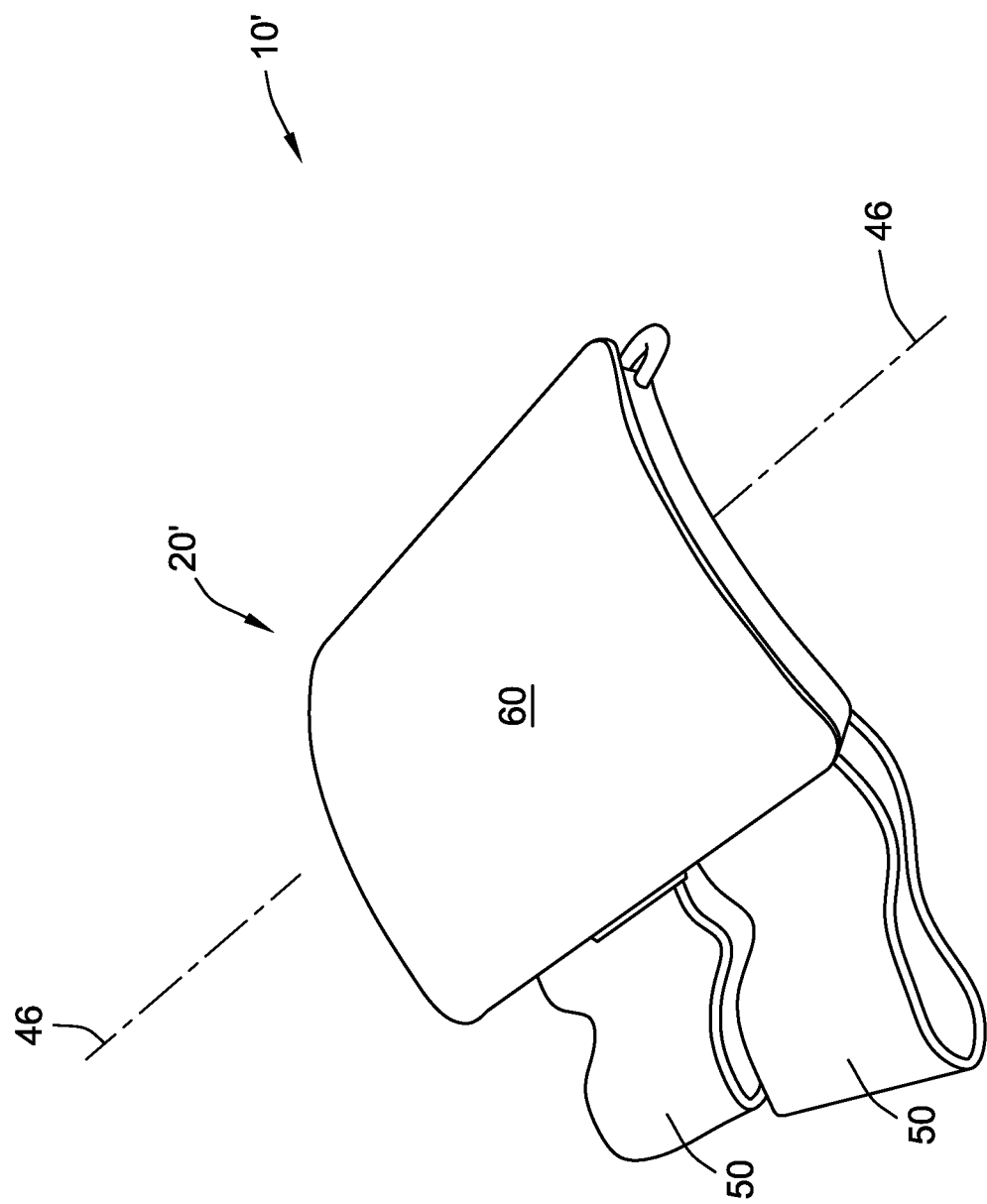
FIG. 8 is a perspective view of the fishing tackle storage device of FIG. 4 in a close configuration, according to some embodiments.

Components of the container body 30' include a bottom, a pair of sidewalls 34' that are spaced from another and that extend upwardly from the bottom, and a pair of end walls 36' that extend upwardly from the bottom and that are spaced from one another along a reference axis 46 (FIGS. 7 and 8). This reference axis 46 may coincide with the long axis of a user's arm in one type of installed/mounted configuration for the fishing tackle storage device 10'. In any case, the bottom of container body 30' (as in the case of the embodiment of FIGS. 1-3) curves at least generally about the reference axis 46 proceeding from one of the side walls 34' to the other of the side walls 34', including with the bottom curving about a single axis. The side walls 34' may be characterized as being spaced from the reference axis 46. In any case, an internal storage space 40' is collectively defined by the bottom, side walls 34', and end walls 36' of the container body 30'.

Figure 4:
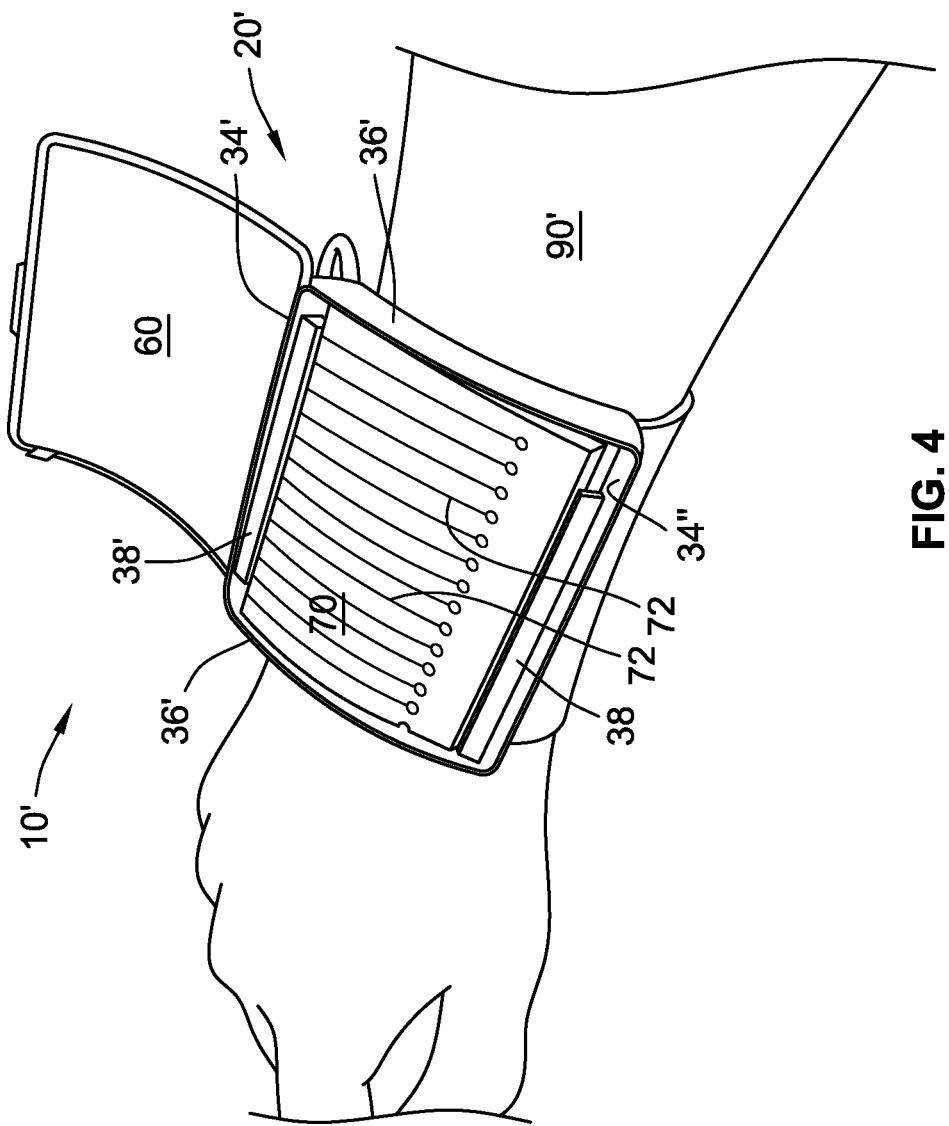
FIG. 4 is a perspective view of another embodiment of a mountable fishing tackle storage device in an open configuration and installed on a user's arm, according to some embodiments.

The insert 70' is removably disposable in this internal storage space 40', although in the embodiment of FIGS. 4-8 the insert 70' includes an appropriate backing 76. One or more tabs, lips, or retention members 38' of the container 20' retain the insert 70' within the internal storage space 40', namely by extending over opposing edge portions of the backing 76. In the embodiment of FIGS. 4-8, the tabs/lips 38' are formed from a different material than the container body 30', and may be attached to the bottom and/or the adjacent side wall 34'. In any case and as in the embodiment of FIGS. 1-3, the tabs/lips 38' may exclusively provide for the retention of the insert 70' within the container body 30' (e.g., the insert 70' is not bonded to the container body 30'). One edge portion of the backing 76 for the insert 70' may be disposed under the tab/lip 38' that is at least generally adjacent to one of the side walls 34', while the opposite edge portion of the backing 76 for the insert 70' may be disposed under the tab/lip 38 that is at least generally adjacent to one of the side walls 34'. As in the embodiment of FIGS. 1-3, when the insert 70' is installed within the container body 30' and as shown in FIGS. 4 and 7, the length dimension of each slit 72 is oriented to follow the curvature of the bottom of the container body 30'. Stated another way, the length dimension of each slit 72 at least generally coincides with the dimension in which the two side walls 34' of the container body 30' are spaced from one another when in the insert 70' is in its installed configuration.

Figure 5:
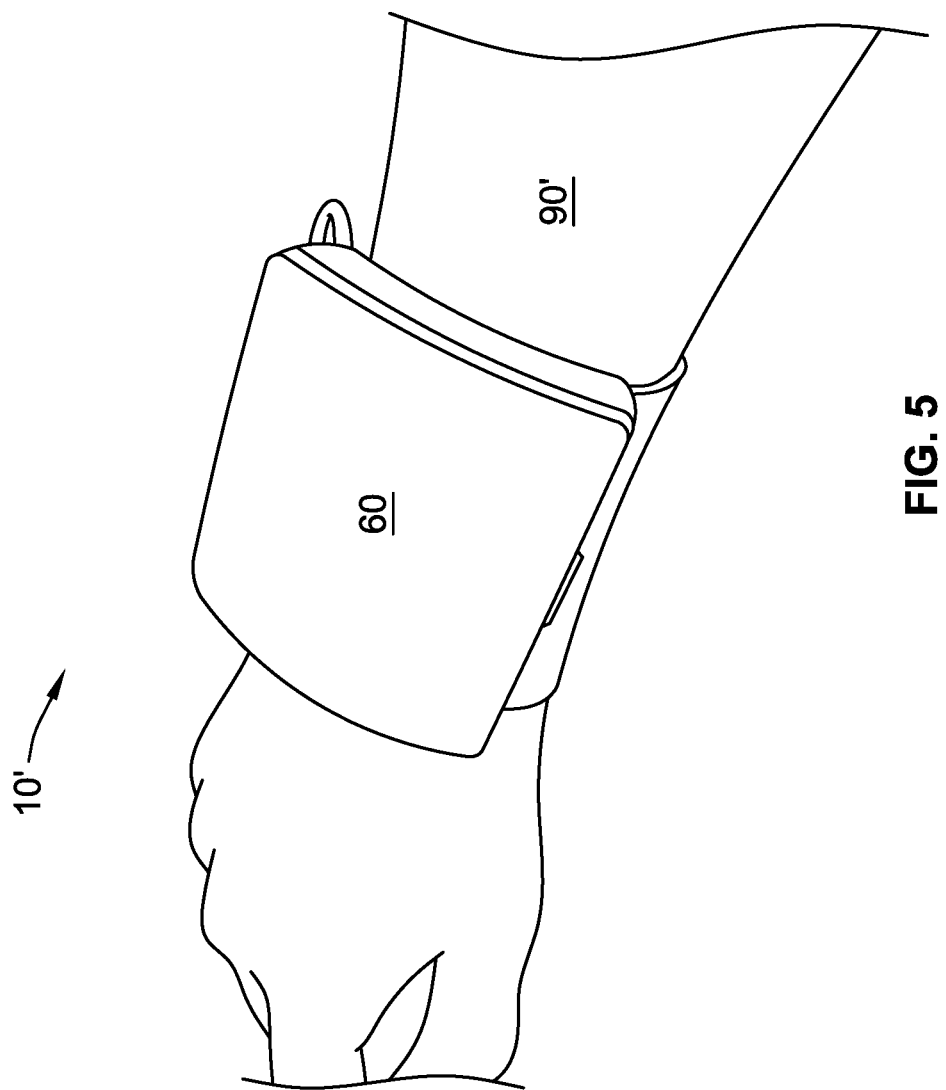
FIG. 5 is a perspective view of the fishing tackle storage device of FIG. 4 in a closed configuration and installed on a user's arm, according to some embodiments.
Figure 6:
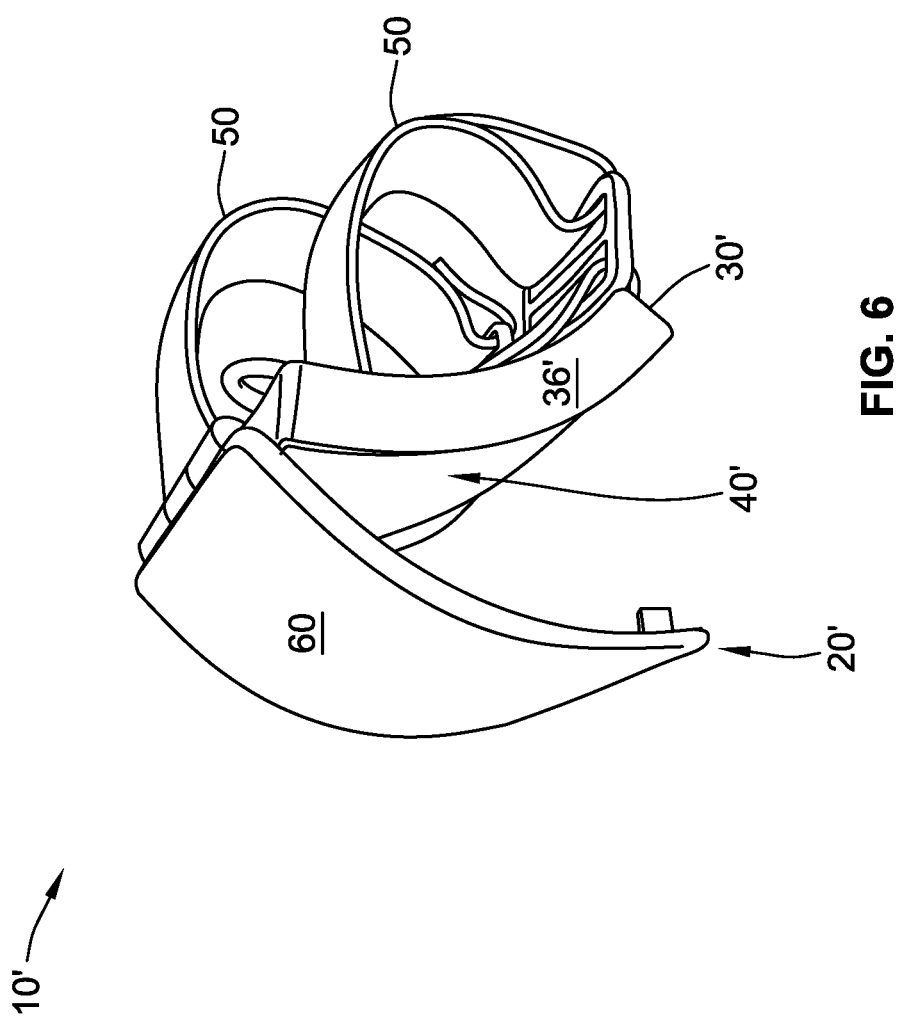
FIG. 6 is an end view of the fishing tackle storage device of FIG. 4 in an open configuration, according to some embodiments.

FIGS. 4 and 5 show the fishing tackle storage device 10' being mounted/installed on an arm 90. The bottom of the fishing tackle storage device 10' has a predefined/preformed curvature proceeding at least generally about a portion of an arm 90. A sleeve (not shown) could be attached to the container body 30' (e.g., the exterior of its bottom) and could be used in place of the strap(s) 50 to install the fishing tackle storage device 10' on an arm 90. An arm 90 is but one type of support on which the fishing tackle storage device 10' may be installed. The fishing tackle storage device 10' may be installed on any appropriate support, including a pole, oar, or the like using one or more straps 50. Each strap 50 that is utilized by the fishing tackle storage device 10' may be of any appropriate configuration, and may use Velcro or any appropriate buckle for securing the fishing tackle storage device 10' to an appropriate support. Using one or more straps 50 may accommodate the installation of the fishing tackle storage device 10' on a variety of supports.

One embodiment of a mountable fishing tackle storage device is illustrated in FIGS. 10-14 and is identified by reference numeral 100. The master fly pad insert storage device 100 includes a container 120, tabs 138 for storing multiple fly pad inserts 170. A container body 130 and a cover 160 collectively define the container 120. Both the container body 130 and cover 160 may be formed from any appropriate material (e.g., plastic; a material(s) that is at least substantially impervious to water), but preferably define what may be characterized as a hardside container 120. Generally, the cover 160 is movable relative to the container body 130 between open and closed positions, preferably while remaining structurally interconnected with the container body 130. A snap-lock 150 may exist between the container body 130 and cover 160 when the cover 160 is in its closed position. Any appropriate restraint may be used to retain the cover 160 in its closed position, but preferably a single hand of a user (and not tooling) is required to displace the cover 160 from the container body 130 to dispose the cover 160 in its open position.

Components of the container body 130 and cover 160 include a bottom 132, a pair of sidewalls 134 that are spaced from another and that extend upwardly from the bottom 132, and a pair of end walls 136 that extend upwardly from the bottom 132 and that are spaced from one another. An internal storage space 140 is collectively defined by the bottom 132, sidewalls 134, and end walls 136. The insert 170 is removably disposable in this internal storage space 140. The insert 170 is removably disposable in this internal storage space 140, primarily by using the finger slot 174 to reach the insert when in disposed position. One or more tabs, lips, or retention members 138 extend from each of the sidewalls 134 of the container body 130 and cover 160 to retain the insert 170 within this internal storage space 140. The tabs/lips 138 may exclusively provide for the retention of the insert 170 within the container body 130 and cover 160 (e.g., the insert 170 is not bonded to the container body 130 or cover 160). One edge portion of the insert 170 may be disposed under each tab/lip 138 that extends from one of the sidewalls 134, while the opposite edge portion of the insert 170 may be disposed under each tab/lip 138 that extends from the other of the sidewalls 134. Each tab/lip 138 extending from the container side walls must not interfere with the ease of use of the finger slot 174 to remove or place the insert into the container body. Master Fly Pad Storage Device One embodiment of a mountable fishing tackle storage device is illustrated in FIGS. 10-14 and is identified by reference numeral 100. The master fly pad insert storage device 100 includes a container 120, tabs 138 for storing multiple fly pad inserts 170. A container body 130 and a cover 160 collectively define the container 120. Both the container body 130 and cover 160 may be formed from any appropriate material (e.g., plastic; a material(s) that is at least substantially impervious to water), but preferably define what may be characterized as a hardside container 120. Generally, the cover 160 is movable relative to the container body 130 between open and closed positions, preferably while remaining structurally interconnected with the container body 130. A snap-lock 150 may exist between the container body 130 and cover 160 when the cover 160 is in its closed position. Any appropriate restraint may be used to retain the cover 160 in its closed position, but preferably a single hand of a user (and not tooling) is required to displace the cover 160 from the container body 130 to dispose the cover 160 in its open position.

Components of the container body 130 and cover 160 include a bottom 132, a pair of sidewalls 134 that are spaced from another and that extend upwardly from the bottom 132, and a pair of end walls 136 that extend upwardly from the bottom 132 and that are spaced from one another. An internal storage space 140 is collectively defined by the bottom 132, sidewalls 134, and end walls 136. The insert 170 is removably disposable in this internal storage space 140. The insert 170 is removably disposable in this internal storage space 140, primarily by using the finger slot 174 to reach the insert when in disposed position. One or more tabs, lips, or retention members 138 extend from each of the sidewalls 134 of the container body 130 and cover 160 to retain the insert 170 within this internal storage space 140. The tabs/lips 138 may exclusively provide for the retention of the insert 170 within the container body 130 and cover 160 (e.g., the insert 170 is not bonded to the container body 130 or cover 160). One edge portion of the insert 170 may be disposed under each tab/lip 138 that extends from one of the sidewalls 134, while the opposite edge portion of the insert 170 may be disposed under each tab/lip 138 that extends from the other of the sidewalls 134. Each tab/lip 138 extending from the container side walls must not interfere with the ease of use of the finger slot 174 to remove or place the insert into the container body.

The cover 160 is movably connected with the container body 130 in any appropriate manner for movement between an open position/configuration and a closed position/configuration, but again preferably remains structurally interconnect with the container body 130. In the illustrated embodiment the cover 160 and container body 130 are movably interconnected by a hinge 144 that allows the cover 160 to move relative to the container body 130 between the noted open and closed positions by movement at least generally about an axis. The axis about which the cover 160 moves relative to the container body 130. Any appropriate manner for retaining the cover 160 in its closed position/configuration may be utilized, such as a snap-lock 150 or the like. However, preferably the cover 160 may be "unlocked" from it closed position/configuration by a single hand of a user and without the use of any tooling or the like such that the cover 160 may thereafter be moved to its open position/configuration. The container 120 may be configured to provide at least somewhat of an impediment to the entry of water into the internal storage space 140 when the cover 160 is in its closed position/configuration.

The insert 170 includes a plurality of slits 172 that are typically disposed in parallel relation to one another. Fishing tackle or lures 180 may be removably disposed in each of the slits 172. In the illustrated embodiment each fishing lure 180 is in the form a hook 184 and a fly 82. The fishing tackle storage device 100 allows a fly fisherman to have one collections of fishing lures 180 on one insert 170, and a different collection of fishing lures 180 on a different insert 170. A user may readily change out one insert 170 (with a first collection of fishing lures 180) for another insert 170 (with a second collection of fishing lures). The user changes insert 170 between storage devices by inserting finger into the half circle cut out of insert 174 to attain grip for removal and insertion. However, multiple inserts 170 are disposable in the container 120 at a given time.

Figure 9:
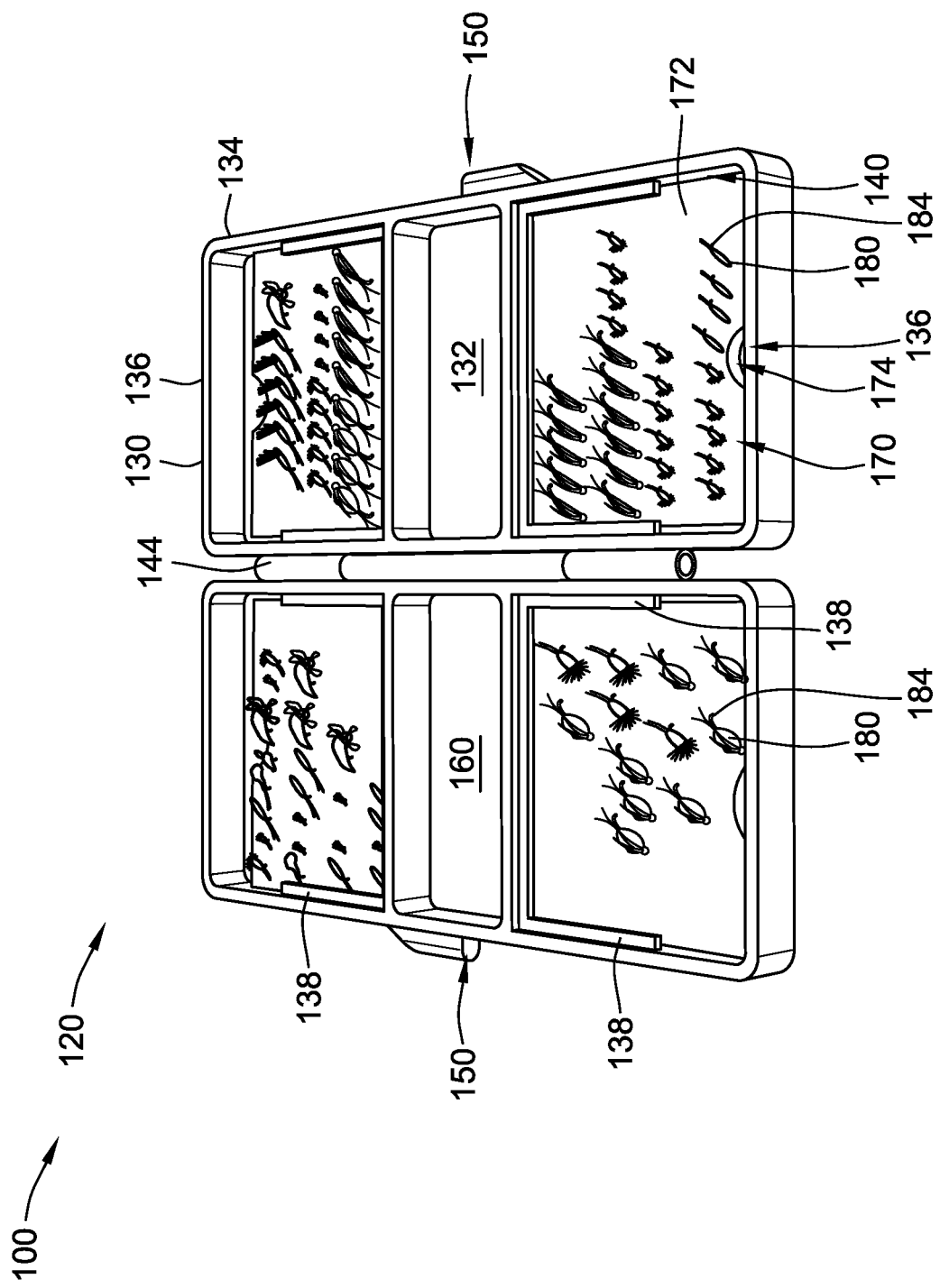
FIG. 9 is a perspective view of a master fly pad insert storage device in an open configuration with fly pad inserts installed, according to some embodiments.
Figure 15:
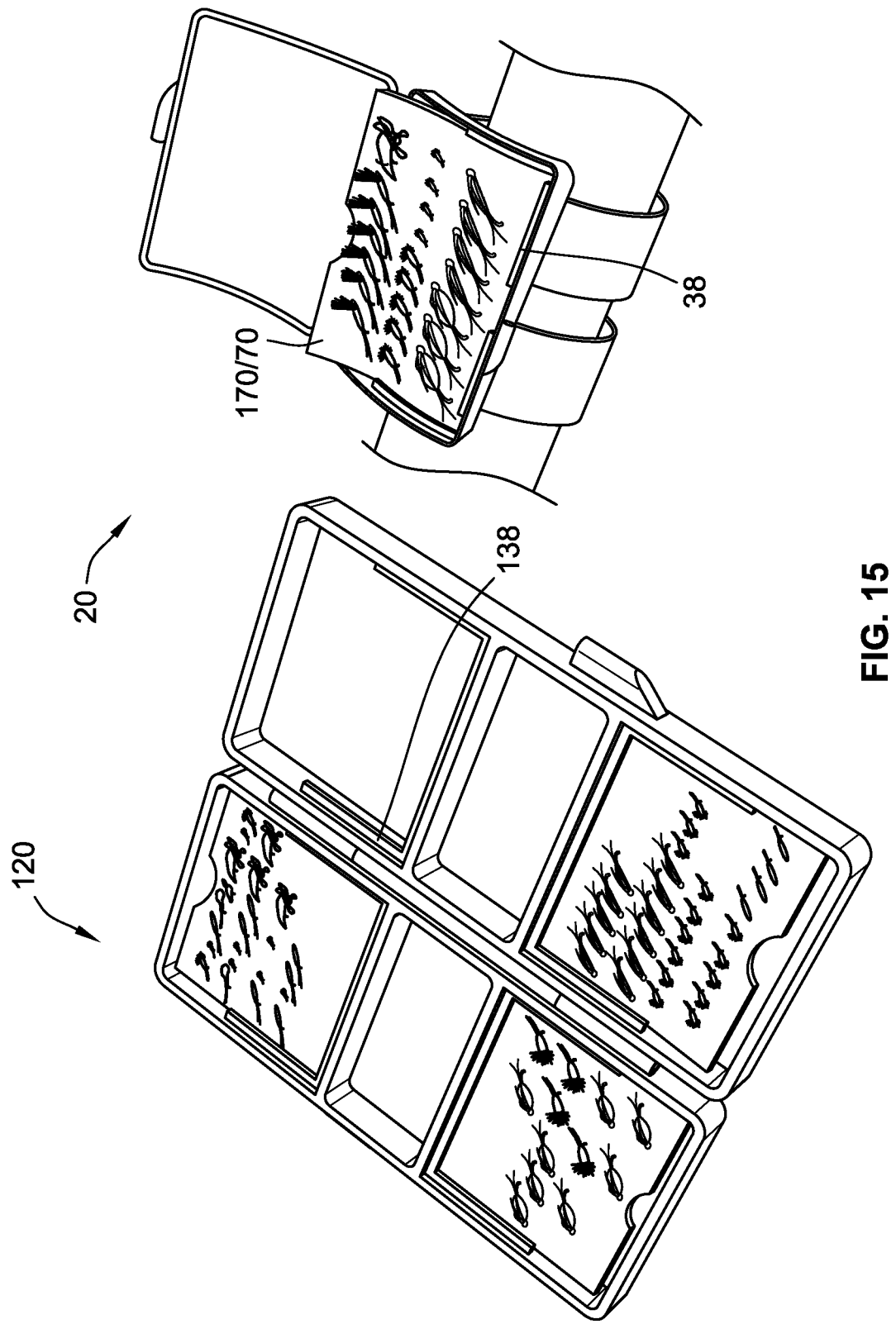
FIG. 15 is a perspective view of a master fly pad insert storage device and the mountable fishing tackle storage device mounted in an open configuration with fly pad moved and partially inserted into the mountable fishing tackle storage device, according to some embodiments.
Figure 16:
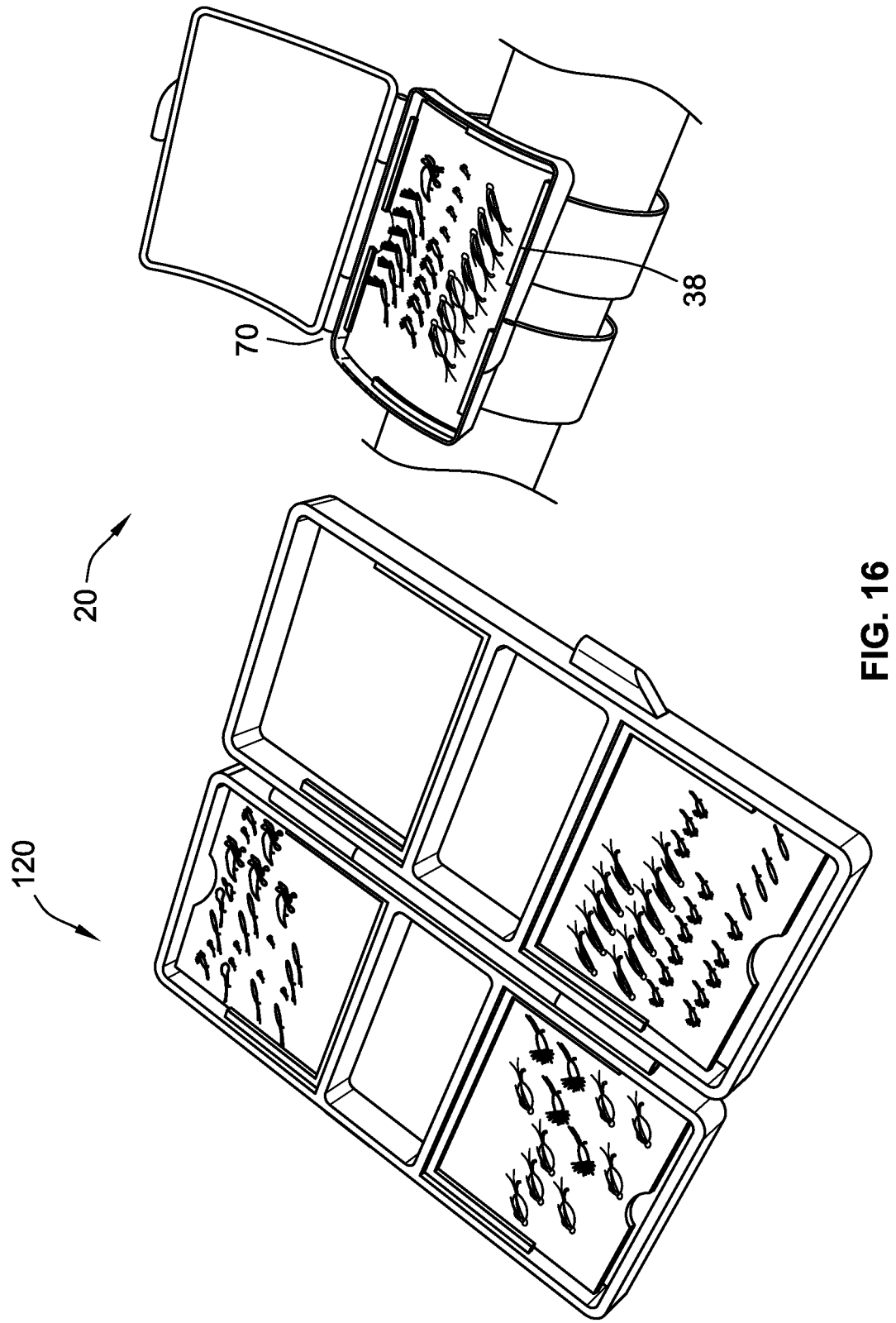
FIG. 16 is a perspective view of a master fly pad insert storage device and the mountable fishing tackle storage device mounted in an open configuration with fly pad moved and fully inserted to the mountable fishing tackle storage device, according to some embodiments.

Typically a user will only need to use one hand (and no tooling) to install in insert 170 in the container body 130 and cover 160, and to also completely remove this insert 170 from the container body 130 and cover 160. This is mainly done by using the finger insert 174 to attain grip on insert 170. Referring to FIG. 15, the user may dispose edge portions of the insert 170 under the tab(s)/lip(s) 138 at one of the side walls 134 for the container body 130 and cover 160. The insert 170 may be flexed by applying pressure using the finger insert 174, so as to allow the opposite edge portion of the insert 170 to be directed under the tab(s)/lip(s) 138 at the other of the side walls 134 for the container body 130 and cover 160 (FIG. 9). As such, opposite edge portions of the installed insert 170 are captured under the corresponding tabs/lips 138 of the container body 130 and cover 160. Again, the tabs/lips 138 should suitably retain an insert 170 within the container body 130 and cover 160 without the need for any additional type of attachment between the insert 170 and container body 130 and cover 160.

The fishing tackle storage device 100' utilizes a container body 130 and a cover 160 collectively define the container 120. A hinge may movably interconnect the container body 130 and cover 160 to allow the cover 160 to be moved between open and closed positions/configurations while remaining structurally interconnected with the container body 130 and cover 160. The axis of this hinge may be parallel with a reference axis parallel to the long edge 134 of the container. As above, both the container body 130 and cover 160 may be formed from any appropriate material (e.g., plastic; a material(s) that is at least substantially impervious to water), but preferably define what may be characterized as a hardside container 120.

Components of the container body 130 and cover 160 include a bottom, a pair of sidewalls 134 that are spaced from another and that extend upwardly from the bottom, and a pair of end walls 136 that extend upwardly from the bottom and that are spaced from one another along a reference axis parallel to the long side wall 134. In any case, an internal storage space 140 is collectively defined by the bottom, side walls 134, and end walls 136 of the container body 130 and cover 160.

Figure 10:
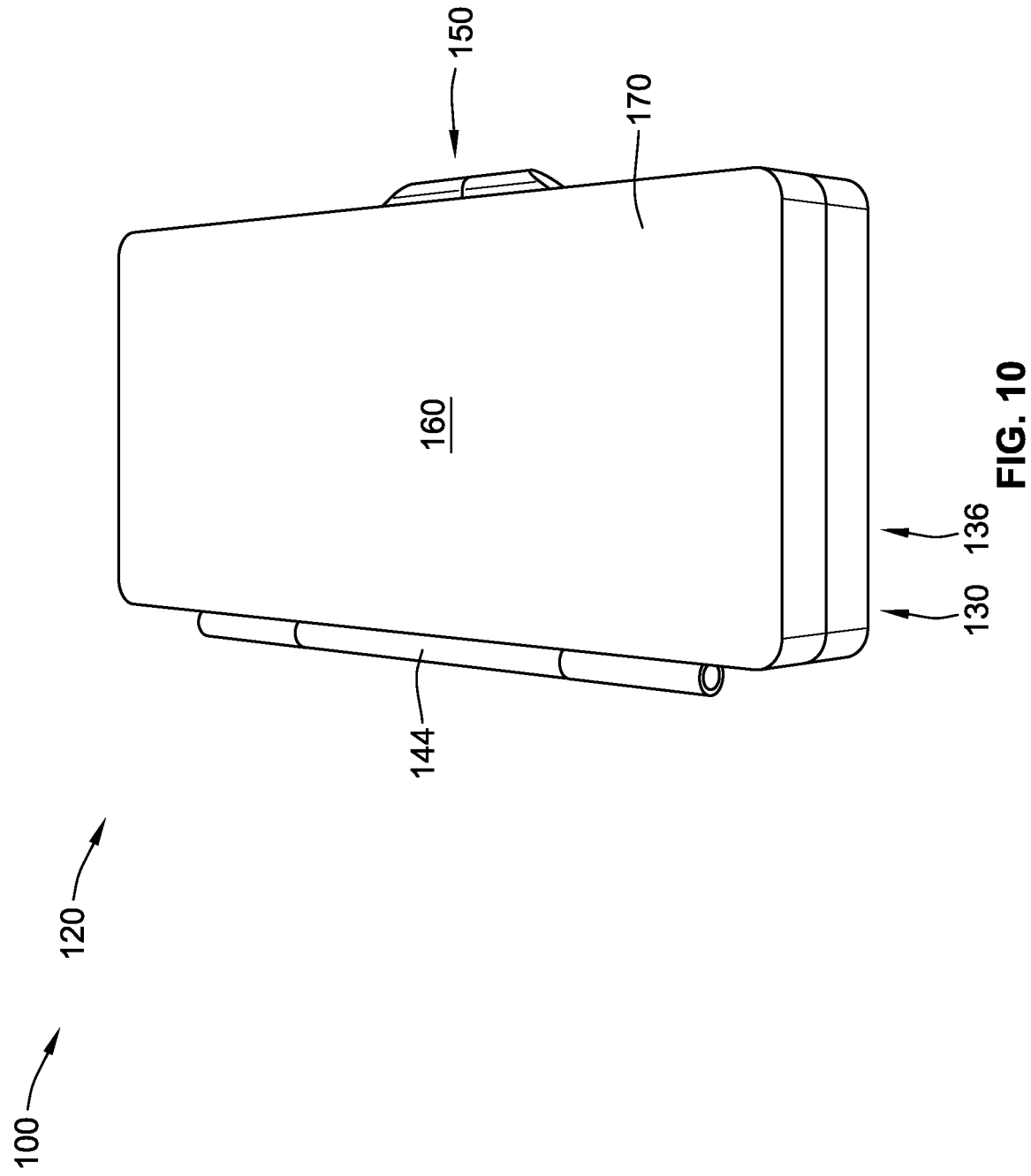
FIG. 10 is a perspective view of a master fly pad insert storage device in a closed configuration with fly pad inserts installed, according to some embodiments.
Figure 11:
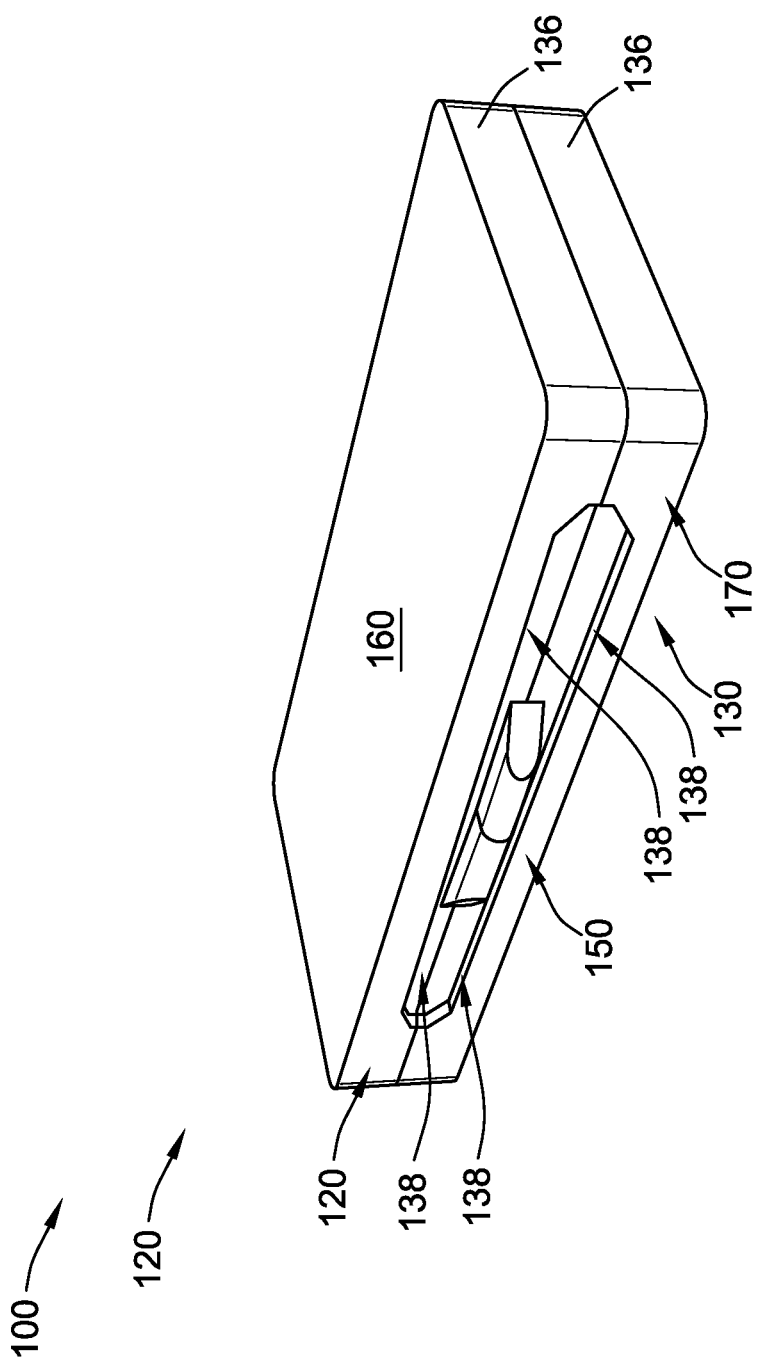
FIG. 11 is a perspective view of a master fly pad insert storage device in a closed position from a corner view with fly pad inserts installed, according to some embodiments.
Figure 12:
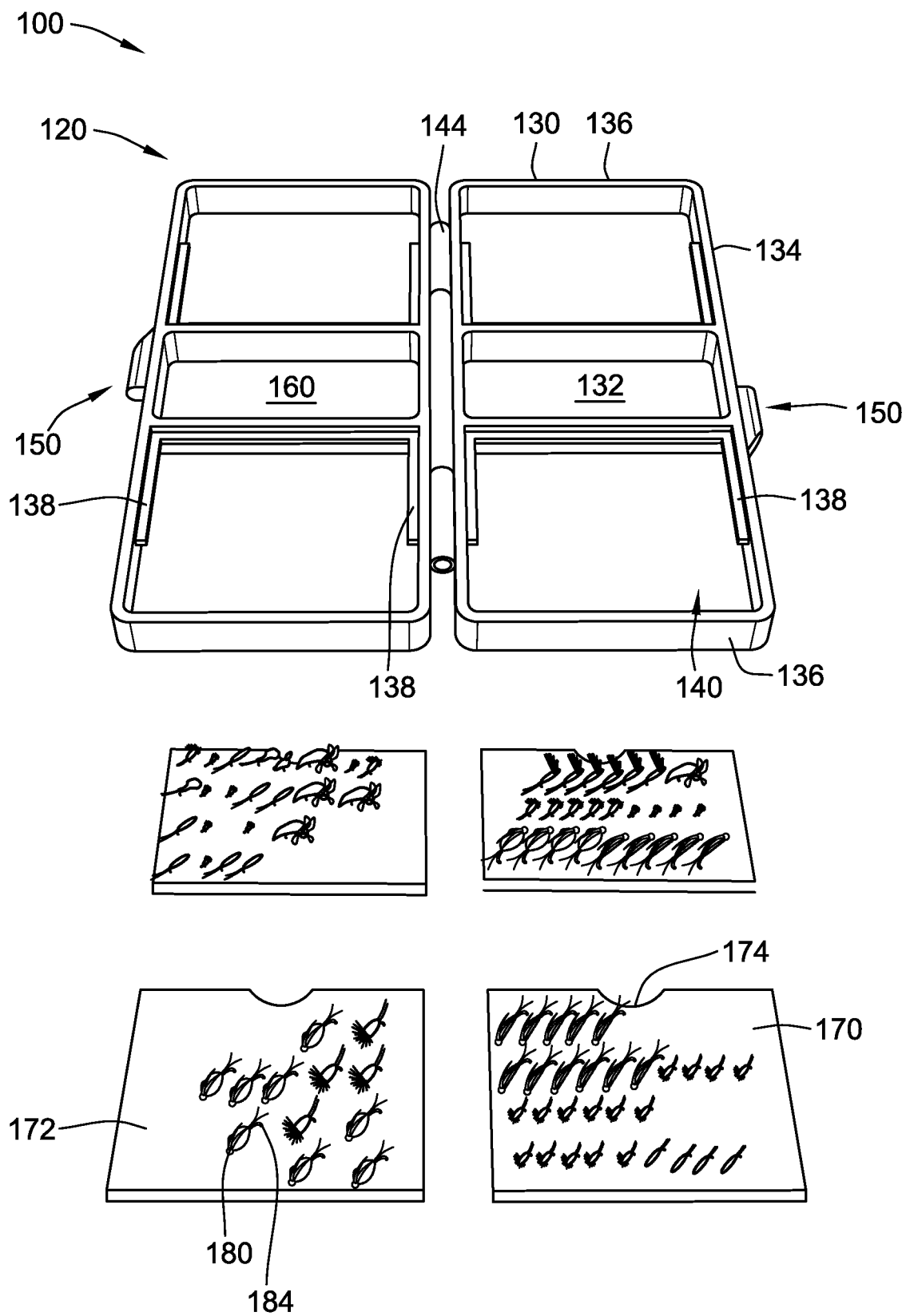
FIG. 12 is a perspective view of a master fly pad insert storage device in an open position with fly pad inserts not installed, according to some embodiments.
Figure 13:
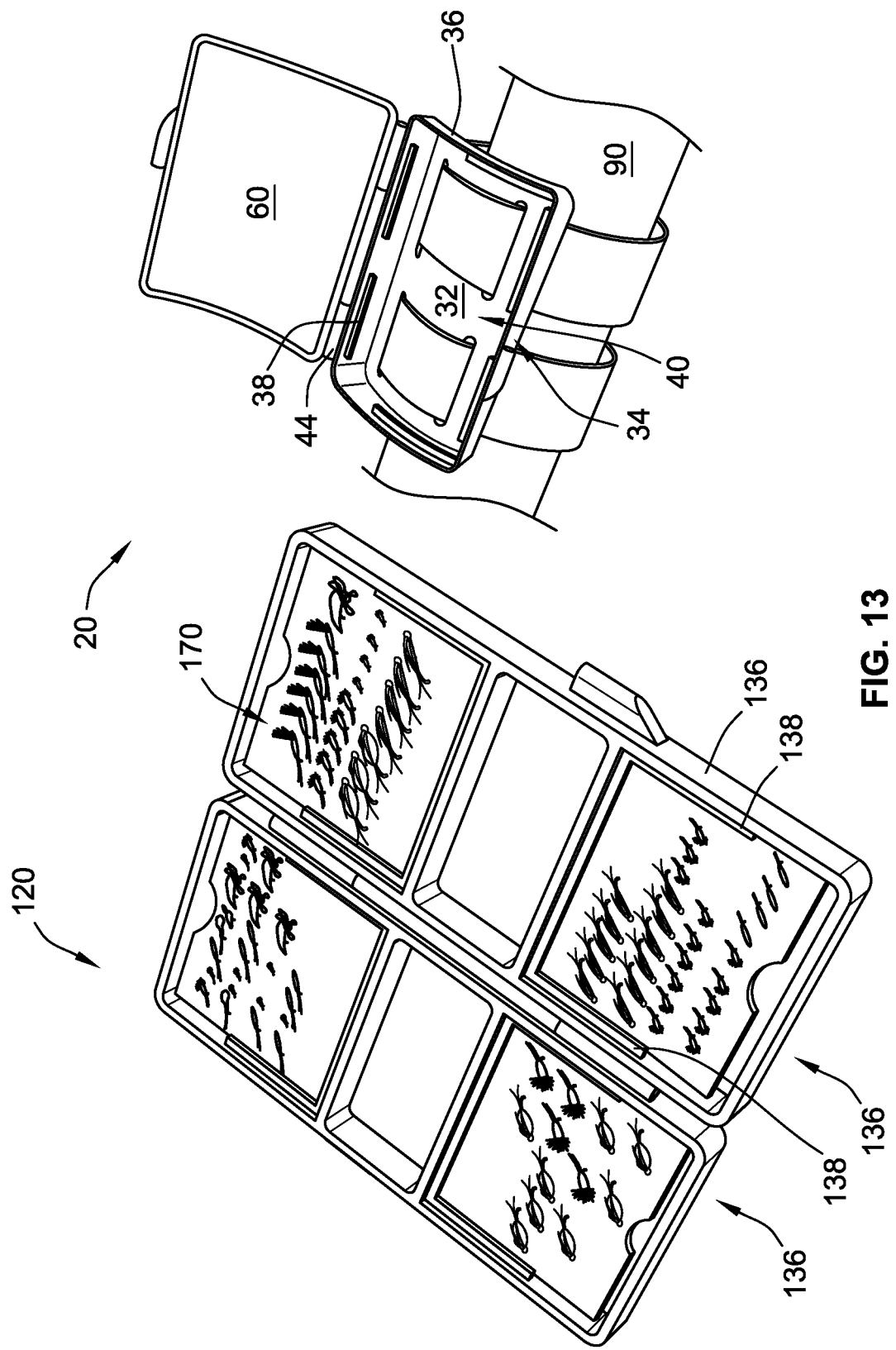
FIG. 13 is a perspective view of a master fly pad insert storage device and the mountable fishing tackle storage device mounted on a curved surface in an open configuration with fly pad inserts installed in the master fly pad storage device, according to some embodiments.
Figure 14:
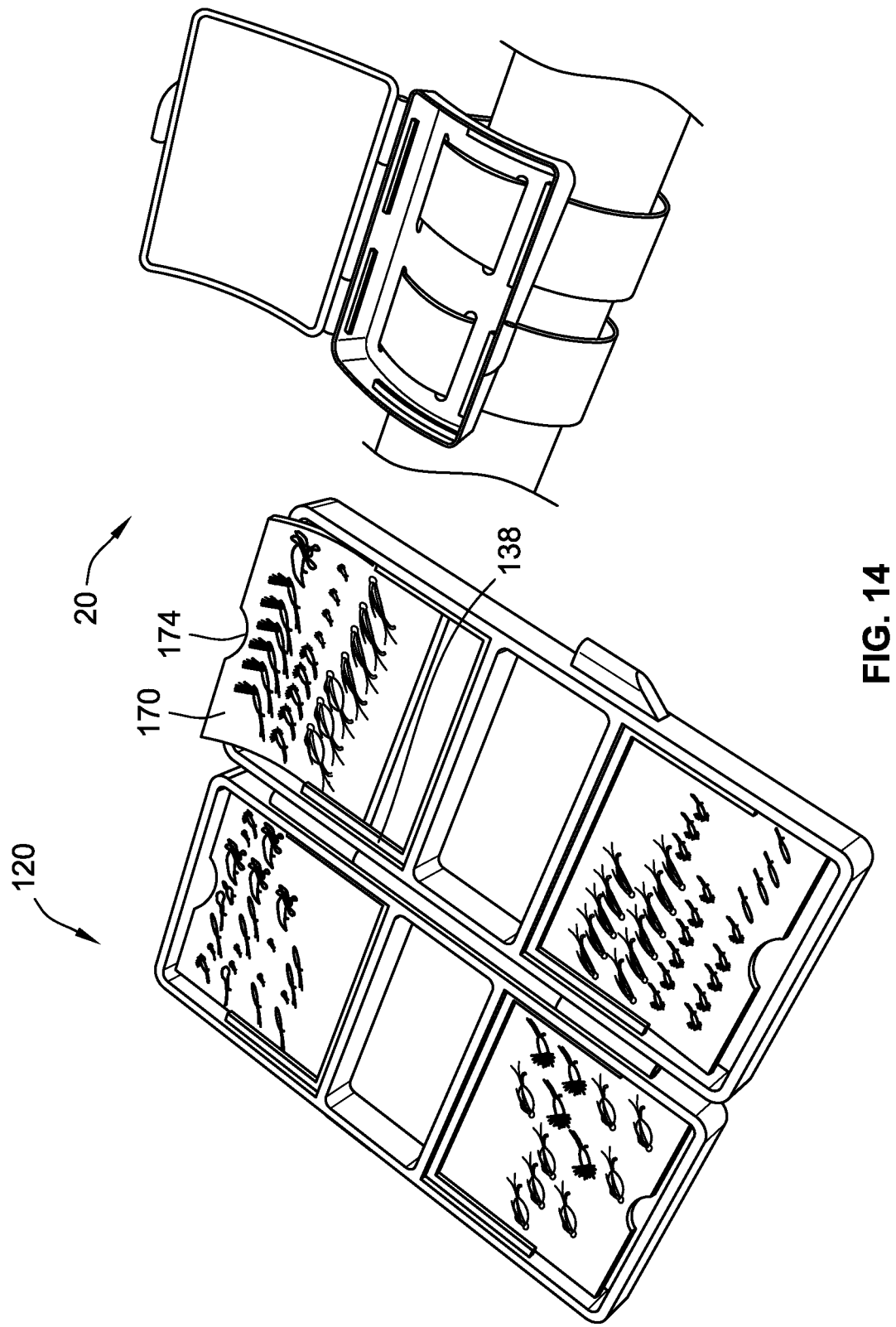
FIG. 14 is a perspective view of a master fly pad insert storage device and the mountable fishing tackle storage device mounted in an open configuration with fly pad inserts partially installed in the master fly pad storage device, according to some embodiments.

The insert 170 is removably disposable in this internal storage space 140. One or more tabs, lips, or retention members 138 of the container 120 retain the insert 170 within the internal storage space 140, namely by extending over opposing edge portions of the backing 76. In the embodiment of FIGS. 10-12, the tabs/lips 138 may be attached to the bottom and/or the adjacent side wall 134. In any case and as in the embodiment of FIGS. 10-12, the tabs/lips 138 may exclusively provide for the retention of the insert 170 within the container body 130 and cover 160 (e.g., the insert 170 is not bonded to the container body 130 and 160). One edge portion of the insert 170 may be disposed under the tab/lip 138 that is at least generally adjacent to one of the side walls 134, while the opposite edge portion of the insert 170 may be disposed under the tab/lip 138 that is at least generally adjacent to one of the side walls 134. As in the embodiment of FIGS. 10-12, when the insert 170 is installed within the container body 130 and cover 160, the length dimension of each slit 172 are spaced from one another when the insert 170 is in its installed configuration.

In some embodiments, a mountable storage device comprises a container including a base and a plurality of sidewalls, wherein the plurality of sidewalls define an inner cavity, wherein at least one of the plurality of sidewalls includes a retention member, and wherein the base includes a mounting point, a strap removably secured to the container via the mounting point, and an insert including a plurality of slits configured to receive and secure fishing tackle, wherein the insert is releasably retained within the inner cavity via the retention member.

In some embodiments, a storage device comprises a container including a first base and a first plurality of sidewalls, wherein the first plurality of sidewalls define a first inner cavity, and wherein at least one of the first plurality of sidewalls includes a first retention member, a cover movable coupled to the container, wherein the cover includes a second base and a second plurality of sidewalls, and wherein at least one of the second plurality of sidewalls includes a second retention member, a first insert including a first plurality of slits configured to receive and secure fishing tackle, wherein the first insert is releasably retained within the first inner cavity via the first retention member, and a second insert including a second plurality of slits configured to receive and secure fishing tackle, wherein the second insert is releasably retained within the second inner cavity via the second retention member, In some embodiments, an apparatus and a corresponding method performed by the apparatus, comprises inserting, into an insert, fishing tackle, wherein the insert includes a plurality of slits configured to receive and secure the fishing tackle and inserting, into a container, the insert, wherein the container includes a base and a plurality of sidewalls, wherein the plurality of sidewalls define an inner cavity of the container, wherein at least one of the plurality of sidewalls includes a retention member, and wherein the insert is releasably retained within the inner cavity via the retention member.

Those skilled in the art will recognize that a wide variety of other modifications, alterations, and combinations can also be made with respect to the above described embodiments without departing from the scope of the disclosure, and that such modifications, alterations, and combinations are to be viewed as being within the ambit of the inventive concept.

What is claimed is:

1. A mountable fishing tackle storage device;
   a curved container comprising a curved internal storage space, a container body, and a cover movable relative to said container body between open and closed positions, wherein said container body comprises first and second retention members that are spaced from one another within said internal storage space, wherein at least a first edge portion of said first insert is disposed under said first retention member, wherein at least a second edge portion of said first insert is disposed under said second retention member, and wherein said first and second edge positions are on oppositely disposed first and second edges of said first insert;

a mounting system that is integrated with said container and that is detachably engageable with a support when said storage device is in an installed configuration; and a first insert removably disposed and exchangeable within said container, wherein said first insert accommodates attachment of multiple fishing lures to said first insert by a corresponding hook being detachably engaged by said first insert.

2. The storage device of claim 1, wherein said container body comprises a first preformed curvature, and wherein said cover comprises a second preformed curvature that at least substantially matches said first preformed curvature.

3. The storage device of claim 2, wherein a major axis for said first preformed curvature at least substantially coincides with a length dimension of a support when said storage device is in said installed configuration on the support, wherein said container body comprises a bottom, first and second sidewalls that extend upwardly from said bottom, and first and second end walls that extend upwardly from said bottom, wherein said major axis coincides with a spacing between said first and second end walls, and wherein said first and second end walls are spaced along the user's arm or leg when said storage device in said installed configuration.

4. The storage device of claim 3, wherein said mounting system comprises one or more straps, a buckle, a latch, and a hook and loop pad that is spaced along the length dimension of a support when said storage device is in said installed configuration.

5. The storage device of claim 1, wherein said container body comprises a bottom that in turn comprises a first preformed curvature, wherein said cover comprises a second preformed curvature that at least substantially matches said first preformed curvature, wherein said container body comprises further first and second sidewalls that extend upwardly from said bottom, and first and second end walls that extend upwardly from said bottom, wherein said first reference axis coincides with a spacing between said first and second end walls, and wherein said first and second end walls are spaced along a user's arm when said storage device in said installed configuration.

6. The storage device of claim 1, wherein said mounting system comprises a pair of straps.

7. The storage device of claim 1, wherein said first insert and said container are in an unbonded by adhesive state at all times.

* * * * *